(12) United States Patent
Chaudhari et al.

(10) Patent No.: US 10,885,676 B2
(45) Date of Patent: Jan. 5, 2021

(54) METHOD AND APPARATUS FOR MODIFYING DISPLAY SETTINGS IN VIRTUAL/AUGMENTED REALITY

(71) Applicant: Samsung Electronics Co., Ltd, Suwon-si (KR)

(72) Inventors: Roshan Chaudhari, Mountain View, CA (US); Vittalbabu Srinivasan, Mountain View, CA (US); Mitchell Williams, Mountain View, CA (US); Christopher Peri, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/391,800

(22) Filed: Dec. 27, 2016

(65) Prior Publication Data

US 2018/0182161 A1    Jun. 28, 2018

(51) Int. Cl.
*G06T 11/00* (2006.01)

(52) U.S. Cl.
CPC .................. *G06T 11/001* (2013.01)

(58) Field of Classification Search
CPC ..... G06T 15/80; G06T 11/001; G06T 19/006; G06T 11/00; G06T 5/00; G06T 9/00; G06T 2207/30041; G06F 3/013; G06F 11/0721; G06F 11/07772; G06F 11/0793;
(Continued)

(56) References Cited

U.S. PATENT DOCUMENTS 5,359,675 A * 10/1994 Siwoff ................ G02B 27/017
                                                              345/8
5,739,797 A *  4/1998 Karasawa ........... G02B 27/017
                                                              345/8
(Continued)

FOREIGN PATENT DOCUMENTS

CN      204168399         2/2015
EP      2891966 A1        7/2015

OTHER PUBLICATIONS

Adobe Photoshop CS3 for Photographers—Martin Evening—2007 (Year: 2007).*

(Continued)

*Primary Examiner* — Charles L Beard

(57) ABSTRACT

An apparatus that modifies display settings of image data is provided. The apparatus stores one or more spectral mappings and receives display data for an image. The received display data includes a plurality of colors and each of the colors includes a plurality of attributes. A spectral mapping, of the one or more spectral mappings, is identified based on a detected user visual limitation. Each of the spectral mappings maps a set of spectral colors to an adjusted set of spectral colors and provides attribute adjustments for the set of spectral colors of image data so an image can be displayed in a manner that mitigates the user's visual limitation. The mapped and adjusted plurality of colors of the image data that mitigate the visual limitation when displayed on a display may mitigate, for example, viewer color blindness, eye strain, biometric measurements and/or other visual limitations.

20 Claims, 7 Drawing Sheets
(2 of 7 Drawing Sheet(s) Filed in Color)

(58) Field of Classification Search
CPC ............ G06F 11/0715; G06K 9/00604; G06K 9/00597; G09G 3/20; G09G 3/003; H04N 13/302
See application file for complete search history.

(56) References Cited

U.S. PATENT DOCUMENTS

| | | | | |
|---|---|---|---|---|
| 5,748,199 | A * | 5/1998 | Palm | H04N 13/0014 345/419 |
| 5,933,130 | A * | 8/1999 | Wagner | G09G 3/3406 345/690 |
| 6,083,656 | A * | 7/2000 | Hare | B41M 3/12 156/235 |
| 6,445,363 | B1 | 9/2002 | Urisaka | G02B 27/017 345/7 |
| 6,456,340 | B1 * | 9/2002 | Margulis | G06T 1/20 345/501 |
| 6,483,485 | B1 * | 11/2002 | Huang | G06F 3/011 345/10 |
| 6,760,474 | B1 * | 7/2004 | Fenne | H04N 19/85 375/E7.189 |
| 7,050,492 | B1 * | 5/2006 | Fenne | H04N 11/042 375/240 |
| 7,145,571 | B2 | 12/2006 | Jones et al. | |
| 7,444,551 | B1 * | 10/2008 | Johnson | G06F 11/0745 714/41 |
| 7,467,289 | B1 * | 12/2008 | Garlick | G06F 9/485 712/228 |
| 7,496,788 | B1 * | 2/2009 | Alfieri | G06F 11/0751 713/323 |
| 7,555,692 | B1 * | 6/2009 | Iacobovici | G06F 9/3001 708/233 |
| 7,600,155 | B1 * | 10/2009 | Nickolls | G06F 11/36 714/38.13 |
| 7,686,460 | B2 * | 3/2010 | Holmgren | G03B 21/14 353/121 |
| 7,711,990 | B1 * | 5/2010 | Nickolls | G06F 11/3648 714/37 |
| 7,739,556 | B1 * | 6/2010 | Duluk, Jr. | G06F 11/0715 345/501 |
| 8,009,878 | B2 * | 8/2011 | Tsai | G06F 3/013 382/117 |
| 8,095,829 | B1 * | 1/2012 | Coon | G06F 11/0715 714/2 |
| 8,127,181 | B1 * | 2/2012 | Shebanow | G06F 11/3636 714/35 |
| 8,301,980 | B2 * | 10/2012 | Gruner | G06F 11/1008 714/758 |
| 8,365,015 | B1 * | 1/2013 | Yu | G06F 9/3863 714/16 |
| 8,428,371 | B2 * | 4/2013 | Morovic | G06T 7/90 382/218 |
| 8,514,149 | B2 * | 8/2013 | Sako | H04N 13/398 345/8 |
| 8,572,573 | B2 * | 10/2013 | Baliga | G06F 11/3632 712/244 |
| 8,690,325 | B1 * | 4/2014 | Straus | A61B 5/1171 351/200 |
| 8,749,573 | B2 * | 6/2014 | Ali | G06F 3/0346 345/592 |
| 8,767,006 | B2 * | 7/2014 | Sullivan | G09G 5/06 345/601 |
| 8,810,413 | B2 * | 8/2014 | Wong | G06F 3/011 340/573.1 |
| 8,977,043 | B2 * | 3/2015 | Dai | G06T 7/529 382/162 |
| 8,984,372 | B2 * | 3/2015 | Gandhi | G06F 11/1064 714/764 |
| 8,988,596 | B2 * | 3/2015 | Watanabe | H04N 5/357 348/362 |
| 9,053,216 | B1 * | 6/2015 | Coleman | G06F 11/3055 |
| 9,179,057 | B2 * | 11/2015 | Sako | H04N 5/232 |
| 9,241,620 | B1 * | 1/2016 | Kockan | A61B 3/0033 |
| 9,292,973 | B2 | 3/2016 | Bar-Zeev et al. | |
| 9,305,229 | B2 | 4/2016 | Delean et al. | |
| 9,305,402 | B2 | 4/2016 | Bilbrey et al. | |
| 9,310,614 | B2 | 4/2016 | Yang et al. | |
| 9,310,883 | B2 | 4/2016 | Weising et al. | |
| 9,311,752 | B2 | 4/2016 | Chosokabe et al. | |
| 9,311,754 | B2 | 4/2016 | Nishimaki et al. | |
| 9,311,884 | B2 | 4/2016 | Akiyama | |
| 9,368,169 | B2 * | 6/2016 | Malladi | G11C 7/1072 |
| 9,430,041 | B2 * | 8/2016 | Leigh | G06F 3/013 |
| 9,450,961 | B2 * | 9/2016 | Stanasolovich | H04L 63/10 |
| 9,465,237 | B2 * | 10/2016 | Tate | G02C 7/083 |
| 9,471,966 | B2 * | 10/2016 | Lin | G06T 5/001 |
| 9,529,653 | B2 * | 12/2016 | Bose | G06F 11/073 |
| 9,607,714 | B2 * | 3/2017 | Malladi | G11C 29/023 |
| 9,690,736 | B2 * | 6/2017 | Ma | G06F 13/4027 |
| 9,696,551 | B2 * | 7/2017 | Yang | G02B 27/0172 |
| 9,704,216 | B1 * | 7/2017 | Laskar | G06T 3/40 |
| 9,721,065 | B2 * | 8/2017 | Berry | G06F 19/3406 |
| 9,734,635 | B1 * | 8/2017 | Gorumkonda | G06T 19/006 |
| 9,761,118 | B2 * | 9/2017 | Lee | H04M 1/72577 |
| 9,787,857 | B2 * | 10/2017 | Kuraya | H04N 1/00037 |
| 9,818,029 | B2 * | 11/2017 | Lee | G06F 3/04842 |
| 9,818,031 | B2 * | 11/2017 | Wexler | G06K 9/00671 |
| 9,823,745 | B1 * | 11/2017 | Fateh | G06F 3/013 |
| 9,823,964 | B2 * | 11/2017 | Reed | G06F 11/1068 |
| 9,824,772 | B2 * | 11/2017 | Malladi | G11C 29/028 |
| 9,928,128 | B2 * | 3/2018 | Barrick | G06F 11/0724 |
| 10,037,080 | B2 * | 7/2018 | Das | H04L 67/12 |
| 10,049,006 | B2 * | 8/2018 | Reed | G06F 11/106 |
| 10,108,262 | B2 * | 10/2018 | Das | G02B 27/0172 |
| 10,109,092 | B1 * | 10/2018 | Hitchings, Jr. | G06T 11/60 |
| 10,114,463 | B2 * | 10/2018 | Cheon | G06F 3/038 |
| 10,168,879 | B1 * | 1/2019 | Duan | G06T 7/13 |
| 10,169,559 | B2 * | 1/2019 | Kim | G06F 13/102 |
| 10,216,521 | B2 * | 2/2019 | Shirvani | G06F 9/3017 |
| 10,229,513 | B2 * | 3/2019 | Chakravorty | G06T 11/001 |
| 10,267,677 | B1 * | 4/2019 | Sarkar | G01J 3/505 |
| 10,269,283 | B2 * | 4/2019 | Sun | G09G 3/2092 |
| 10,424,116 | B2 * | 9/2019 | Kim | G06K 9/00597 |
| 10,444,973 | B2 * | 10/2019 | Cox | G06Q 10/10 |
| 10,473,934 | B2 * | 11/2019 | Samec | G02B 21/0032 |
| 10,509,553 | B1 * | 12/2019 | Duan | G06T 11/001 |
| 10,531,066 | B2 * | 1/2020 | Sun | H04N 13/398 |
| 10,630,868 | B2 * | 4/2020 | Shaw | H04N 1/6019 |
| 10,712,897 | B2 * | 7/2020 | Kumar | G06F 3/0484 |
| 10,721,510 | B2 * | 7/2020 | Gopalan | H04N 21/4402 |
| 10,726,762 | B2 * | 7/2020 | An | G06T 3/0093 |
| 10,747,312 | B2 * | 8/2020 | Samadani | G06T 7/20 |
| 2001/0044912 | A1 | 11/2001 | Francis | G06F 11/0721 714/30 |
| 2002/0051086 | A1 * | 5/2002 | Su | H04N 9/73 348/602 |
| 2002/0099257 | A1 * | 7/2002 | Parker | A61M 21/00 600/27 |
| 2002/0122588 | A1 * | 9/2002 | Yamamoto | G06K 9/0061 382/167 |
| 2002/0180734 | A1 * | 12/2002 | Endoh | G06F 3/04815 345/428 |
| 2003/0095705 | A1 * | 5/2003 | Weast | G06T 11/001 382/167 |
| 2003/0105605 | A1 * | 6/2003 | Degani | G06T 7/0012 702/104 |
| 2003/0218643 | A1 * | 11/2003 | Sakata | G06F 3/0481 715/865 |
| 2004/0027594 | A1 * | 2/2004 | Suzuki | G09B 21/00 358/1.2 |
| 2004/0085327 | A1 * | 5/2004 | Jones | G09B 29/003 345/591 |
| 2004/0167806 | A1 * | 8/2004 | Eichhorn | G02B 21/26 705/3 |
| 2004/0212815 | A1 * | 10/2004 | Heeman | G06T 11/001 358/1.9 |
| 2004/0223641 | A1 * | 11/2004 | Koyama | H04N 1/40012 382/162 |
| 2004/0247175 | A1 * | 12/2004 | Takano | H04N 13/189 382/154 |

(56) References Cited

U.S. PATENT DOCUMENTS

| | | | |
|---|---|---|---|
| 2004/0252276 A1* | 12/2004 | Nanjo | A61B 3/12 351/206 |
| 2005/0024733 A1* | 2/2005 | Richards | G02B 26/008 359/634 |
| 2005/0024734 A1* | 2/2005 | Richards | H04N 9/3111 359/634 |
| 2005/0052705 A1* | 3/2005 | Hersch | B41M 3/14 358/3.28 |
| 2005/0099630 A1* | 5/2005 | Reynolds | G06F 3/0488 356/402 |
| 2005/0105051 A1* | 5/2005 | Jones | A61B 3/032 351/242 |
| 2005/0134800 A1* | 6/2005 | Kim | H04N 9/68 351/242 |
| 2005/0190967 A1* | 9/2005 | Ok | H04N 1/54 382/167 |
| 2005/0261557 A1* | 11/2005 | Baker | A61B 3/0083 600/300 |
| 2006/0077405 A1* | 4/2006 | Topfer | H04N 1/6027 358/1.9 |
| 2007/0106950 A1* | 5/2007 | Hutchinson | H04N 9/3102 715/761 |
| 2007/0126933 A1* | 6/2007 | Ting | G09G 5/026 348/649 |
| 2007/0182755 A1* | 8/2007 | Jones | G06T 11/001 345/592 |
| 2007/0236656 A1* | 10/2007 | Jeong | H04N 9/68 351/159.24 |
| 2007/0273708 A1* | 11/2007 | Andreasson | G06T 11/001 345/593 |
| 2008/0062192 A1* | 3/2008 | Voliter | G06F 3/04845 345/591 |
| 2008/0068359 A1* | 3/2008 | Yoshida | G09G 3/3406 345/204 |
| 2008/0107361 A1* | 5/2008 | Asukai | A61B 3/113 382/317 |
| 2008/0129839 A1* | 6/2008 | Asukai | H04N 5/23293 348/231.99 |
| 2008/0137948 A1* | 6/2008 | Tamagawa | H04N 1/6058 382/167 |
| 2008/0193011 A1* | 8/2008 | Hayashi | G06T 1/00 382/167 |
| 2009/0096807 A1* | 4/2009 | Silverstein | G06T 11/001 345/593 |
| 2009/0128871 A1* | 5/2009 | Patton | G06T 11/001 358/520 |
| 2009/0179848 A1* | 7/2009 | Schmidt | G09G 3/2081 345/102 |
| 2009/0201309 A1* | 8/2009 | Demos | G01J 3/02 345/589 |
| 2010/0014000 A1* | 1/2010 | Ko | G09G 5/02 348/603 |
| 2010/0020117 A1* | 1/2010 | Tanizoe | G09G 5/005 345/690 |
| 2010/0053438 A1* | 3/2010 | Kumamoto | H04N 21/485 348/569 |
| 2010/0097407 A1* | 4/2010 | Zulch | G01J 3/504 345/690 |
| 2010/0208304 A1* | 8/2010 | Murase | G06T 7/90 358/3.26 |
| 2010/0245536 A1* | 9/2010 | Huitema | H04N 7/147 348/14.08 |
| 2010/0251017 A1* | 9/2010 | Yamada | G06F 11/0724 714/15 |
| 2010/0277105 A1* | 11/2010 | Oyama | H05B 47/11 315/312 |
| 2011/0001987 A1* | 1/2011 | Scheibengraber | A61B 6/08 356/622 |
| 2011/0012896 A1* | 1/2011 | Ji | H04N 13/0429 345/419 |
| 2011/0012920 A1* | 1/2011 | Saigo | G06T 11/001 345/601 |
| 2011/0102867 A1* | 5/2011 | Ohira | H04N 1/6022 358/504 |
| 2011/0164122 A1* | 7/2011 | Hardacker | H04N 13/0425 348/53 |
| 2011/0164184 A1* | 7/2011 | Avkarogullari | G06F 3/1431 348/571 |
| 2011/0167380 A1* | 7/2011 | Stallings | G06F 3/0482 715/784 |
| 2011/0187834 A1* | 8/2011 | Morifuji | H04N 13/02 348/47 |
| 2011/0229023 A1* | 9/2011 | Jones | G06T 11/001 382/162 |
| 2011/0246939 A1* | 10/2011 | Kasahara | G06T 11/001 715/810 |
| 2011/0274346 A1* | 11/2011 | Sato | G06F 17/3025 382/162 |
| 2012/0019843 A1* | 1/2012 | Kishimoto | H04N 1/6058 358/1.9 |
| 2012/0026518 A1* | 2/2012 | Nishizawa | H04N 1/60 358/1.9 |
| 2012/0057781 A1* | 3/2012 | Morovic | G06T 7/90 382/164 |
| 2012/0057785 A1* | 3/2012 | Morovic | H04N 1/6047 382/167 |
| 2012/0133676 A1* | 5/2012 | Kitahara | H04N 5/23293 345/633 |
| 2012/0133733 A1* | 5/2012 | Sakaniwa | H04N 13/0025 348/43 |
| 2012/0147163 A1* | 6/2012 | Kaminsky | G09G 5/028 348/62 |
| 2012/0195498 A1* | 8/2012 | Miyazaki | H04N 1/603 382/162 |
| 2012/0197874 A1* | 8/2012 | Zatkin | G06Q 30/0282 707/722 |
| 2012/0254698 A1* | 10/2012 | Ozer | G06F 11/106 714/764 |
| 2013/0013124 A1* | 1/2013 | Park | G06F 3/04847 700/296 |
| 2013/0057573 A1* | 3/2013 | Chakravarthula | G06F 3/005 345/619 |
| 2013/0076872 A1* | 3/2013 | Wang | H04N 13/0022 13/22 |
| 2013/0141697 A1* | 6/2013 | Berry | G16H 40/63 351/223 |
| 2013/0147725 A1* | 6/2013 | Chu | G06T 19/00 345/173 |
| 2013/0176326 A1* | 7/2013 | Safaee-Rad | H04N 21/4318 345/590 |
| 2013/0215147 A1* | 8/2013 | Hilkes | G02B 27/017 345/633 |
| 2013/0235069 A1* | 9/2013 | Ubillos | G09G 5/026 345/594 |
| 2013/0335435 A1 | 12/2013 | Ambrus et al. | |
| 2013/0342512 A1* | 12/2013 | Smith | G09G 3/3611 345/204 |
| 2014/0015850 A1* | 1/2014 | Ahn | H04N 1/60 345/594 |
| 2014/0055506 A1* | 2/2014 | Chandel | G09G 3/2003 345/690 |
| 2014/0066196 A1* | 3/2014 | Crenshaw | A63F 13/10 463/31 |
| 2014/0089734 A1* | 3/2014 | Busaba | G06F 11/0715 714/16 |
| 2014/0118354 A1* | 5/2014 | Pais | G09G 5/373 345/428 |
| 2014/0200079 A1* | 7/2014 | Bathiche | A63F 13/00 463/32 |
| 2014/0223287 A1* | 8/2014 | Wang | G06T 11/001 715/234 |
| 2014/0223325 A1* | 8/2014 | Melendez | G06F 3/1273 715/744 |
| 2014/0225978 A1* | 8/2014 | Saban | H04N 1/622 348/14.07 |
| 2014/0258684 A1* | 9/2014 | Hastie | G06F 9/3005 712/216 |

(56) References Cited

U.S. PATENT DOCUMENTS

| | | | |
|---|---|---|---|
| 2014/0267284 A1* | 9/2014 | Blanche | G09G 3/003 345/428 |
| 2014/0267364 A1* | 9/2014 | Lapinski | G09G 5/026 345/593 |
| 2014/0281424 A1* | 9/2014 | Bobba | G06F 9/3005 712/225 |
| 2014/0292637 A1* | 10/2014 | Peng | G02B 27/0172 345/156 |
| 2015/0029223 A1* | 1/2015 | Kaino | G06T 19/006 345/633 |
| 2015/0042861 A1* | 2/2015 | Kitagawa | H04N 5/217 348/333.02 |
| 2015/0145883 A1* | 5/2015 | Marti | G09G 3/20 345/592 |
| 2015/0150445 A1* | 6/2015 | Iravani | A61B 3/0033 351/223 |
| 2015/0157255 A1* | 6/2015 | Nduka | A61B 5/165 600/301 |
| 2015/0168723 A1* | 6/2015 | Eto | H04N 9/73 348/51 |
| 2015/0170380 A1* | 6/2015 | Duwenhorst | G06T 11/001 345/594 |
| 2015/0192776 A1* | 7/2015 | Lee | A61B 3/066 345/690 |
| 2015/0234693 A1* | 8/2015 | Palframan | G06F 11/0751 714/37 |
| 2015/0269709 A1* | 9/2015 | Zhao | G09G 3/2096 345/589 |
| 2015/0287345 A1 | 10/2015 | Tanuwidjaja | |
| 2015/0293524 A1* | 10/2015 | Sato | G05B 19/4093 700/181 |
| 2015/0325008 A1* | 11/2015 | Scarff | G09G 5/377 345/605 |
| 2015/0379348 A1* | 12/2015 | Whritenor | G06K 9/00597 382/117 |
| 2016/0033772 A1* | 2/2016 | Han | H04N 1/6083 359/630 |
| 2016/0085302 A1 | 3/2016 | Publicover et al. | |
| 2016/0148354 A1* | 5/2016 | Finlayson | G06T 5/007 382/164 |
| 2016/0171741 A1* | 6/2016 | Stewart | G06T 13/80 345/473 |
| 2016/0180801 A1* | 6/2016 | Lee | G06K 9/00604 345/156 |
| 2016/0198942 A1* | 7/2016 | Dai | G02C 7/06 351/159.74 |
| 2016/0231578 A1* | 8/2016 | Hardison | G02B 27/2221 |
| 2016/0240008 A1* | 8/2016 | Haddick | G06T 11/001 |
| 2016/0253071 A1* | 9/2016 | Mishra | G06F 3/04817 715/811 |
| 2016/0270656 A1* | 9/2016 | Samec | A61B 3/085 |
| 2016/0283093 A1* | 9/2016 | Burns | G06F 3/04847 |
| 2016/0334868 A1* | 11/2016 | Pacheco | G06K 9/0061 |
| 2016/0351104 A1* | 12/2016 | Yaras | G09G 3/2022 |
| 2016/0360167 A1* | 12/2016 | Mitchell | H04N 9/3194 |
| 2016/0363994 A1* | 12/2016 | Yokoya | G06F 3/013 |
| 2016/0379397 A1* | 12/2016 | Zhou | G06T 13/80 715/815 |
| 2017/0010481 A1* | 1/2017 | Ryan | G02C 7/086 |
| 2017/0025091 A1* | 1/2017 | Haddick | G09G 5/02 |
| 2017/0055825 A1* | 3/2017 | Tumlinson | A61B 3/032 |
| 2017/0060347 A1* | 3/2017 | Li | G06F 3/0481 |
| 2017/0076438 A1* | 3/2017 | Kottenstette | G06K 9/00637 |
| 2017/0079527 A1* | 3/2017 | Daneshi Kohan | A61B 3/112 |
| 2017/0092007 A1* | 3/2017 | Goldberg | G02B 27/0172 |
| 2017/0108918 A1* | 4/2017 | Boesen | G02B 27/0172 |
| 2017/0111723 A1* | 4/2017 | Boesen | H04W 76/14 |
| 2017/0119246 A1* | 5/2017 | Li | A61B 3/0025 |
| 2017/0153700 A1* | 6/2017 | Kondo | G06F 3/012 |
| 2017/0153791 A1* | 6/2017 | Kolli | G06F 3/04842 |
| 2017/0169613 A1* | 6/2017 | VanBlon | G06F 3/165 |
| 2017/0199396 A1* | 7/2017 | Knoll | G02C 7/101 |
| 2017/0220774 A1* | 8/2017 | Orbach | G16H 10/20 |
| 2017/0243406 A1* | 8/2017 | Yamazaki | G06T 19/20 |
| 2017/0269807 A1* | 9/2017 | Nugent | G06F 3/0412 |
| 2017/0293145 A1* | 10/2017 | Miller | G02B 27/0172 |
| 2017/0293356 A1* | 10/2017 | Khaderi | A63F 13/212 |
| 2017/0295276 A1* | 10/2017 | Wang | H04W 52/0258 |
| 2017/0295357 A1* | 10/2017 | Yang | H04N 13/0055 |
| 2017/0302913 A1* | 10/2017 | Tonar | H04N 13/305 |
| 2017/0315772 A1* | 11/2017 | Lee | G06F 3/1446 |
| 2017/0316607 A1* | 11/2017 | Khalid | G06T 19/006 |
| 2017/0318213 A1* | 11/2017 | Oshima | H04N 5/2353 |
| 2017/0322422 A1* | 11/2017 | Stone | G02B 6/0035 |
| 2017/0322714 A1* | 11/2017 | Sato | G06F 3/04847 |
| 2017/0323481 A1* | 11/2017 | Tran | G06T 19/006 |
| 2017/0337664 A1* | 11/2017 | Grahn | G06T 7/49 |
| 2017/0351753 A1* | 12/2017 | Duncker | G06F 17/30554 |
| 2017/0352137 A1* | 12/2017 | Van Der Vleuten | H04N 1/4072 |
| 2017/0359467 A1* | 12/2017 | Norris | H04M 3/568 |
| 2017/0359536 A1* | 12/2017 | Lee | H04N 5/3577 |
| 2018/0004544 A1* | 1/2018 | Vasiltschenko | H04L 67/26 |
| 2018/0052755 A1* | 2/2018 | Suzuki | G06F 11/3419 |
| 2018/0088699 A1* | 3/2018 | Dao | G09G 3/36 |
| 2018/0129573 A1* | 5/2018 | Iturbe | G06F 11/0793 |
| 2018/0130393 A1* | 5/2018 | Akhavan | G09G 3/3208 |
| 2018/0132780 A1* | 5/2018 | Saar | A61B 5/6898 |
| 2018/0136486 A1* | 5/2018 | MacNamara | A61B 3/00 |
| 2018/0164608 A1* | 6/2018 | Schmeder | G02C 7/104 |
| 2018/0182161 A1* | 6/2018 | Chaudhari | G06T 11/001 |
| 2018/0197313 A1* | 7/2018 | Chakravorty | G06T 11/001 |
| 2018/0247440 A1* | 8/2018 | Heo | G09G 5/14 |
| 2018/0317766 A1* | 11/2018 | Predham | A61B 3/111 |
| 2018/0333092 A1* | 11/2018 | Roshan | A61B 5/18 |
| 2018/0361109 A1* | 12/2018 | Eng | G09G 5/10 |
| 2019/0025584 A1* | 1/2019 | Dai | A61F 9/08 |
| 2019/0095729 A1* | 3/2019 | Dai | G06K 9/00825 |
| 2019/0102242 A1* | 4/2019 | Sullivan | G06F 11/0727 |
| 2019/0130869 A1* | 5/2019 | Chang | G09G 5/02 |
| 2019/0206087 A1* | 7/2019 | Noll | G06F 3/0481 |
| 2019/0350066 A1* | 11/2019 | Herf | H05B 47/16 |
| 2019/0354344 A1* | 11/2019 | Chen | G06F 3/167 |
| 2019/0385344 A1* | 12/2019 | Martin | G06T 11/001 |
| 2020/0126268 A1* | 4/2020 | Zhou | G06F 16/5838 |
| 2020/0151910 A1* | 5/2020 | Noll | G06T 7/90 |
| 2020/0266252 A1* | 8/2020 | Cancel Olmo | H04N 5/89 |

OTHER PUBLICATIONS

Yu-Chieh Chen and Tai-Shan Liao, "Hardware Digital Color Enhancement for Color Vision Deficiencies", ETRI Journal, vol. 33, No. 1, Feb. 2011, pp. 71-77.
Visolve Toolbar, http://www.rycbi-sol.co.jp/visolve/windows/en/toolbar.html, Ryobi, System Solutions, 2013, 1 page.
Dobie, Alex, "Android L includes new display modes for color blind users", http://www.androidcentral.com/android-L-includes-new-display-modes-color-blind-users, Mobile Nations, 2016, 4 pages.
Yamamoto, Mike, "LCD monitor designed for the colorblind", http://www.cnet.com/news/led-monitor-designed-for-the-colorblind, CNET, Nov. 26, 2007, 1 page.
European Patent Office, "Supplementary European Search Report," Application No. EP17886985.5, dated Oct. 23, 2019, 7 pages.

* cited by examiner

METHOD AND APPARATUS FOR MODIFYING DISPLAY SETTINGS IN VIRTUAL/AUGMENTED REALITY

TECHNICAL FIELD

This disclosure relates generally to wireless communication systems. More specifically, this disclosure relates to an exemplary embodiment of a method and apparatus for modifying display settings in virtual/augmented reality.

BACKGROUND

Currently, mobile devices are being used to provide virtual reality (VR) and augmented reality (AR) experiences. VR provides for an environment to be interacted with in a seemingly real or physical way by a person. AR provides for is a technology enriching the real world with digital information. Some people experience either mild discomfort due to eyestrain or even worse, complete blindness in certain colors, when viewing VR and AR displays. Also, many applications tend to use harsh bright colors that can also tire a person's eyes over time. Currently there are no methods to deal with these issues as a single solution with current VR and AR systems for all applications. Many users experience eyestrain because of incorrect monitor settings for their eyes over long use.

SUMMARY

An embodiment of this disclosure provides an apparatus for modifying display settings. The apparatus includes a memory configured to store one or more spectral mappings. The apparatus also includes at least one processor operably connected to the memory. At least one processor is configured to receive display data for an image, the display data comprising a plurality of colors. Each color of the plurality of colors includes a plurality of attributes. The processor is also configured to identify a spectral mapping, of the one or more spectral mappings, for an attribute of the plurality of attributes, wherein the attribute is related to a color of the plurality of colors. The spectral mapping indicates adjustments in the plurality of attributes. The processor is also configured to adjust the attribute of the plurality of attributes according to the spectral mapping. The apparatus also includes a display configured to display the image with the adjusted attribute for the color.

Another embodiment of this disclosure provides a method of modifying an image color. This method includes receiving display data for an image, the display data comprising a plurality of colors, each color of the plurality of colors including a plurality of attributes. The method also includes identifying a spectral mapping, of one or more spectral mappings, for an attribute of the plurality of attributes, wherein the attribute is related to a color of the plurality of colors, wherein the spectral mapping indicates adjustments in the plurality of attributes. The method also includes adjusting the attribute of the plurality of attributes according to the spectral mapping. The method also includes displaying the image with the adjusted attribute for the color.

Yet another embodiment of this disclosure provides a non-transitory computer readable medium comprising program code, that when executed by at least one processor, causes at least one processor to receive display data for an image, the display data comprising a plurality of colors, each color of the plurality of colors including a plurality of attributes. The code also causes the processor to identify a spectral mapping, of one or more spectral mappings, for an attribute of the plurality of attributes, wherein the attribute is related to a color of the plurality of colors, wherein the spectral mapping indicates adjustments in the plurality of attributes. The code also causes the processor to adjust the attribute of the plurality of attributes according to the spectral mapping. The code also causes the processor to display the image with the adjusted attribute for the color.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

The patent or application file contains at least one drawing executed in color. Copies of this patent or patent application publication with color drawing(s) will be provided by the Office upon request and payment of the necessary fee For a more complete understanding of this disclosure and its advantages, reference is now made to the following description, taken in conjunction with the accompanying drawings, in which.

DETAILED DESCRIPTION

FIGS. 1 through 7, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

In daily life, colorblind people come across many situations such as while observing beauty of the nature, playing videos games where they cannot distinguish between different colors. To assist these people, embodiments of this disclosure provide color correction techniques inside a shader of a processor. In different embodiments, the user can select a type of color blindness and the system can modify the shader depending on the selection.

Figure 1:
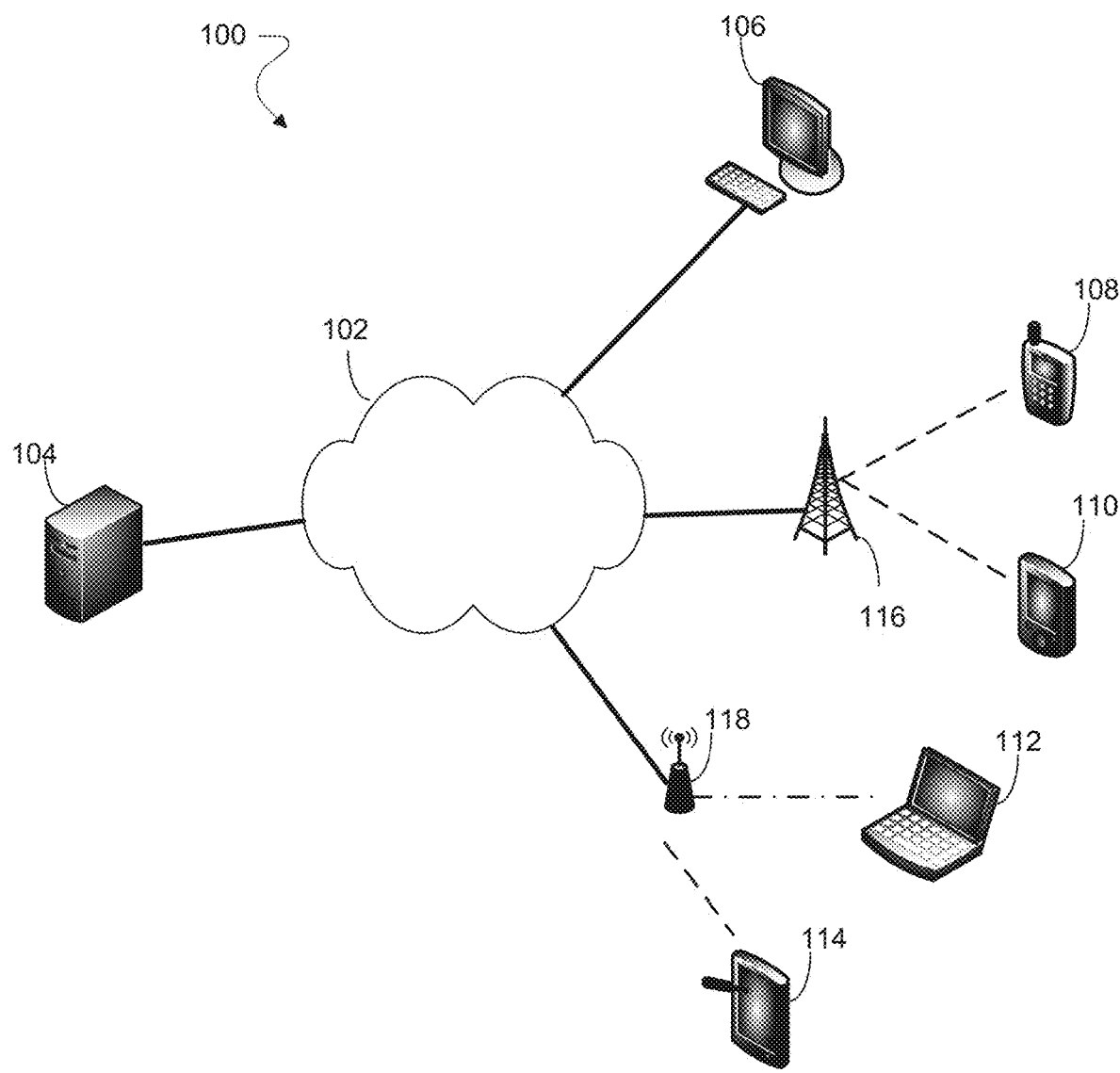
FIG. 1 illustrates an example computing system in which one or more embodiments of the present disclosure may be implemented.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-114. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the computing system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

As described in more detail below, one or more of the client devices 108-114 can modify display settings. The client devices 108-114, or a device coupled to one of the client devices 108-114, can directly make hue (including tint, shade and tone), saturation, and luminosity modification and adjustments in the shader, allowing the user to increase their comfort or address a disability without relying on each publishing platform or content creators to allow such modifications.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
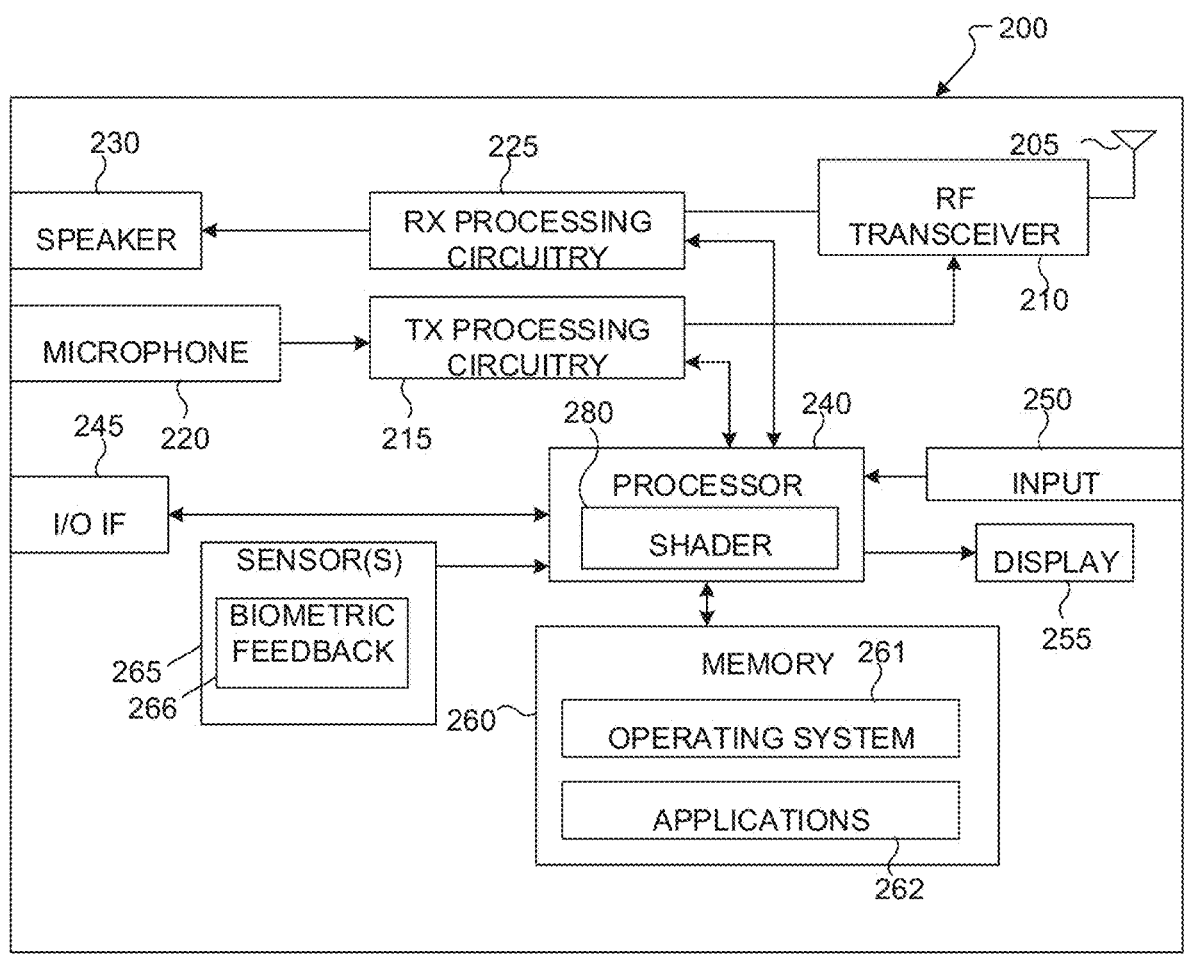
FIG. 2 illustrates an example HMD according to embodiments of the present disclosure and in which embodiments of the present disclosure may be implemented.

FIG. 2 illustrates an example HMD 200 according to embodiments of the present disclosure and in which embodiments of the present disclosure may be implemented. The embodiment of the HMD 200 illustrated in FIG. 2 is for illustration only, the HMD 200 comes in a wide variety of configurations, and FIG. 2 does not limit the scope of this disclosure to any particular implementation of a HMD. HMD 200 can be one examples of a client device 108-114 as shown in FIG. 1, or a device coupled to one of the client devices 108-114.

In various embodiments, the HMD 200 may take different forms, and the present disclosure is not limited to any particular form. For example, the HMD 200 may be a mobile communication device, such as, for example, a user equipment, a mobile station, a subscriber station, a wireless terminal, a smart phone, a tablet, etc., that is mountable within a headset for VR and/or AR applications. In other examples, the HMD 200 may include the headset and take the form of a wearable electronic device, such as, for example, glasses, goggles, a helmet, etc., for the VR and/or AR applications.

As shown in FIG. 2, the HMD 200 includes an antenna 205, a radio frequency (RF) transceiver 210, transmit (TX) processing circuitry 215, a microphone 220, and receive (RX) processing circuitry 225. The HMD 200 also includes a speaker 230, a processor 240, an input/output (I/O) interface (IF) 245, a touchscreen 250, a display 255, a memory 260, and one or more sensors 265. The memory 260 includes an operating system (OS) 261 and one or more applications 262.

The RF transceiver 210 receives, from the antenna 205, an incoming RF signal transmitted by an access point (e.g., base station, WiFi router, Bluetooth device) for a network (e.g., a WiFi, Bluetooth, cellular, 5G, LTE, LTE-A, WiMAX, or any other type of wireless network). The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data (such as web data, e-mail, or interactive video game data) from the processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The processor 240 can include one or more processors or other processing devices and execute the OS 261 stored in the memory 260 in order to control the overall operation of the HMD 200. For example, the processor 240 could control the reception of forward channel signals and the transmission of reverse channel signals by the RF transceiver 210, the RX processing circuitry 225, and the TX processing circuitry 215 in accordance with well-known principles. In some embodiments, the processor 240 includes at least one microprocessor or microcontroller. On another embodiment, the processor 240 could also be implemented as processing circuitry. The processor 240 can carry out the operations or instructions of any process disclosed herein.

The processor 240 is also capable of executing other processes and programs resident in the memory 260. The processor 240 can move data into or out of the memory 260 as required by an executing process. In some embodiments, the processor 240 is configured to execute the applications 262 based on the OS 261 or in response to signals received from eNBs or an operator. The processor 240 is also coupled to the I/O interface 245, which provides the HMD 200 with the ability to connect to other devices, such as laptop computers and handheld computers. The I/O interface 245 is the communication path between these accessories and the processor 240.

The processor 240 is also coupled to the touchscreen 250 and the display 255. The operator of the HMD 200 can use the touchscreen 250 to enter data and/or inputs into the HMD 200. The display 255 may be a liquid crystal display, light-emitting diode (LED) display, organic LED (OLED), active matrix OLED (AMOLED), or other display capable of rendering text and/or graphics, such as from web sites, videos, games, etc.

The memory 260 is coupled to the processor 240. Part of the memory 260 could include a random access memory (RAM), and another part of the memory 260 could include a Flash memory or other read-only memory (ROM).

HMD 200 further includes one or more sensor(s) 265 that can meter a physical quantity or detect an activation state of the HMD 200 and convert metered or detected information into an electrical signal. For example, sensor 265 may include one or more buttons for touch input, e.g., on the headset or the HMD 200, a camera, a gesture sensor, a gyroscope or gyro sensor, an air pressure sensor, a magnetic sensor or magnetometer, an acceleration sensor or accelerometer, a grip sensor, a proximity sensor, a color sensor 265H (e.g., a Red Green Blue (RGB) sensor), a bio-physical sensor, a temperature/humidity sensor, an illumination sensor 265K, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 265 can further include a control circuit for controlling at least one of the sensors included therein. As will be discussed in greater detail below, one or more of these sensor(s) 265 may be used to obtain biometric feedback 266, which can include biometric information from a user, such as eye stress, eye fatigue, and eye tracking. Any of these sensor(s) 265 may be located within the HMD 200, within a headset configured to hold the HMD 200, or in both the headset and HMD 200, for example, in embodiments where the HMD 200 includes a headset.

The input 250 can include a touch panel, a (digital) pen sensor, a key, or an ultrasonic input device. The input 250 can recognize, for example, a touch input in at least one scheme among a capacitive scheme, a pressure sensitive scheme, an infrared scheme, or an ultrasonic scheme. The input 250 can also include a control circuit. In the capacitive scheme, the input 250 can recognize touch or proximity.

As described in more detail below, the HMD 200 may include circuitry and applications for modifying display settings for an HMD. The HMD 200 can be configured to modify display settings in a shader 280 stage of a virtual reality (VR)/augmented reality (AR) rendering engine. Shader 280 can be part of processor 240. The HMD 200 can create a profile system that targets specific hue modification and saturation level based on targeted colors, and/or provide default profiles with specific mitigation goals. Profiles with specific mitigation goals can be profiles focused on certain type of mitigation. For example, the types of mitigations can include, but are not limited to, reducing potential eyestrain, addressing Protanopia, addressing Deuteranopia, addressing Tritanopia, addressing monochromatic vision, and the like.

The HMD 200 can employ biometric feedback to automatically modify a profile if potential motion sickness is detected. For example, the HMD 200 may identify that the user is experiencing symptoms of eye strain and implement a profile that addresses eye strain. The HMD 200 can also employ application metadata that includes a description of the application to suggest or automatically trigger a user display profile. For example, if the application uses green elements and orange elements to distinguish features, the HMD 200, when having identified a Deuternopia user, may implement a profile directed towards Deuteranopia to increase the luminosity of the green colors. In another example, if the application includes vivid colors, after a period of time, the HMD 200 may adjust the hue to decrease the vividness in order to reduce eye strain.

Although FIG. 2 illustrates one example of HMD 200, various changes may be made to FIG. 2. For example, various components in FIG. 2 could be combined, further subdivided, or omitted and additional components could be added according to particular needs. As a particular example, the processor 240 could be divided into multiple processors, such as one or more central processing units (CPUs) and one or more graphics processing units (GPUs). Also, while FIG. 2 illustrates the HMD 200 configured as a mobile telephone, tablet, or smartphone, the HMD 200 could be configured to operate as other types of mobile or stationary devices. The HMD 200 can work in cooperation and as part of wireless network 100 as shown in FIG. 1.

Various embodiments of this disclosure recognize and take into account that is not enough to simply replace colors or make global changes in brightness or saturation, because for each situation a specific mitigation must be determined. A situation can include a type of color blindness in a user, physiological conditions such as eye strain or headaches, and the like. Each situation can be approached by the use of a specific mitigation and the use of a corresponding profile.

For example, color blindness has various forms, with red/green (Deuternopia) being the most common. In this example, the situation can be that the user has Deuternopia and an application includes green and red colors in high frequency. One type of mitigation can be color replacement, but in a VR/AR environment it may be desirable to take into account similar objects using the same replacement color. For mild Deuternopia, a flattening of the red and green color spectrum, or increasing red/green luminosity can be used. Flattening of the color spectrum or increasing luminosity allows for consistency in the color scheme.

Figure 3:
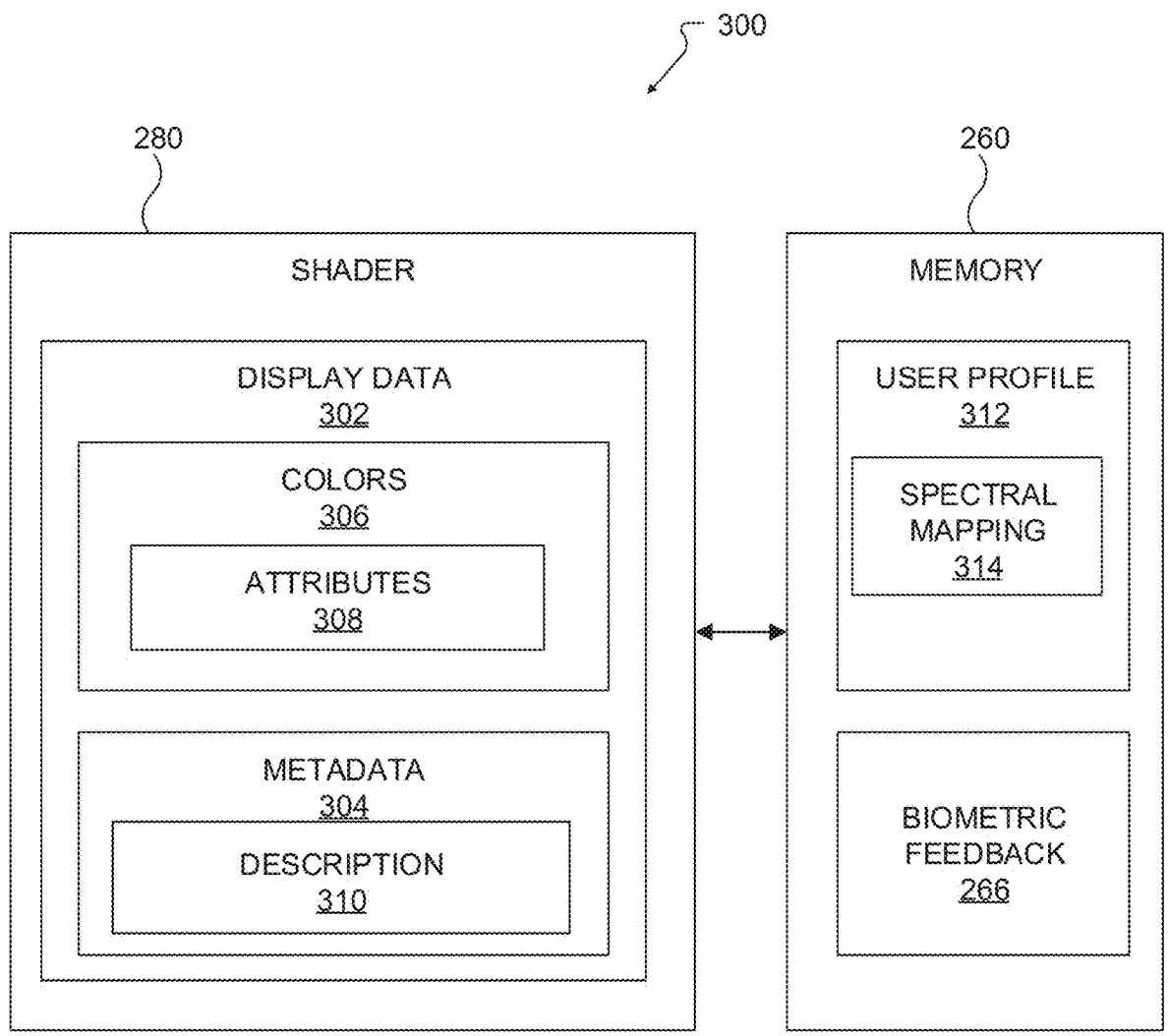
FIG. 3 illustrates a block diagram of a color adjustment system according to various embodiments of this disclosure.

In one example situation for eyestrain reduction, saturation and blue hues can be reduced as a mitigation technique. Some examples provide color temperature adjustments such as reducing blue hues as mitigations for situations. However these do not remap colors to mitigate loss of detail when reduced too much. Depending on the amount of time in the headset and the type of application, a user may want high saturation (like action gaming) and heightened blue hues. In relaxation applications, the user may want the reverse, less blue hues and increased tint or shade. As such, in various embodiments of this disclosure, the user, HMD 200, or manufacturer can create a number of "profiles" based on mitigation goals, personal preference, and visual limitations FIG. 3 illustrates a block diagram of a color adjustment system 300 according to various embodiments of this disclosure. The color adjustment system 300 shown in FIG. 3 is for illustration only. Other embodiments of the color adjustment system 300 could be used without departing from the scope of this disclosure. The color adjustment system 300 could be implemented as part of HMD 200 as shown in FIG. 2.

In FIG. 3, the color adjustment system 300 includes a shader 280 and memory 260. The shader 280 and memory 260 may be examples of shader 280 and memory 260 as shown in FIG. 2. Shader 280 can be a computer program, processing circuitry, or both, where the shader 280 includes display data 302 containing information about colors 306 of an image or video. The display data 302 can be an image and/or a series of image that make a video. The display data can include metadata 304 and colors 306.

The shader 280 can be used to manage the production of appropriate levels of the colors 306 within an image, and/or produce special effects or do video post-processing. Shader 280 can calculate rendering effects on graphics hardware with a high degree of flexibility. Shader 280 can be coded for a graphics processing unit (GPU). The colors 306 includes different attributes 308, such as, but not limited to, position, hue, saturation, brightness, and contrast of all pixels, vertices, or textures, and uses the attributes 308 to construct a final image that can be altered on the fly, using algorithms defined in the shader 280, and can be modified by external variables or textures introduced by a program calling the shader 280.

In different example embodiments, the shader 280 can perform different types of modifications. For example, shader 280 can modify color saturation levels to reduce eyestrain or heighten object distinctions, reduce color temperature if the user is susceptible to eyestrain, introduce new colors that a user can see such that there will be more distinguishable colors in the scene, perform hatching by drawing different hatch patterns depending on the color. These types of modifications can be used during rendering of the image and/or video.

In various embodiments, the shader 280 uses metadata 304 to determine what modifications to make to the display data 302. For example, the metadata 304 could include a description 310 of the display data 302 that could indicate the modifications or mitigations to be used with the display data 302. In another example, the metadata 304 could include important colors used in the application. In this example, the HMD 200 can apply a mitigation technique based on information known by the user and the metadata 304.

An example of metadata 304 is a set of mappings that the shader performs on the output color. The metadata can consist of a mapping of colors from a range to a different range. The shader can modify hue, saturation and value data for color ranges.

In various embodiments, a user profile 312 indicates the modifications to be used with display data 302. A user profile 312 can also include a spectral mapping 314 that maps a set of spectral colors to another set of spectral colors. The mapping 314 allows for colors 306 to be adjusted to a new set of colors for display. A user, HMD 200, manufacturer, etc., may create the user profile 312 based on mitigation goals, personal preference, and visual limitations.

The HMD 200 manufacturer can create predefined user profiles 312 that can be standard on the device and available for all users. The selected user profile 312 can persists in the device until the user overrides the profile 312. The user can change the user profile at any time to an existing user profile 312 or create a new user profile 312. Any user profile 312 changes can be immediately implemented by the shader 280.

In various embodiments, the shader 280 can use biometric feedback 266 to make modifications to the display data 302. Biometric feedback 266 is the process of obtaining information about physiological functions using sensors. Some of the information that can be obtained includes eyestrain, brainwaves, and heart rate. The different physiological information can be obtained through one of the sensors 265 as shown in FIG. 2. For example, the eyestrain can be obtained through a camera sensor, brainwaves through an electroencephalogram, and the heart rate through an photoplethysmography. In one example embodiment, the shader 280 can use biometric feedback 266 indicating that a user is experiencing eyestrain to modify the display data 302. In this example, the shader 280 may use a spectral mapping that is pre-set for use during eyestrain.

Although FIG. 3 illustrates one example of HMD 200, various changes may be made to FIG. 3. For example, various components in FIG. 3 could be combined, further subdivided, or omitted and additional components could be added according to particular needs. As a particular example, while FIG. 3 illustrates the HMD 200 configured as a mobile telephone or smartphone, HMDs could be configured to operate as other types of mobile or stationary devices.

Figure 4A:
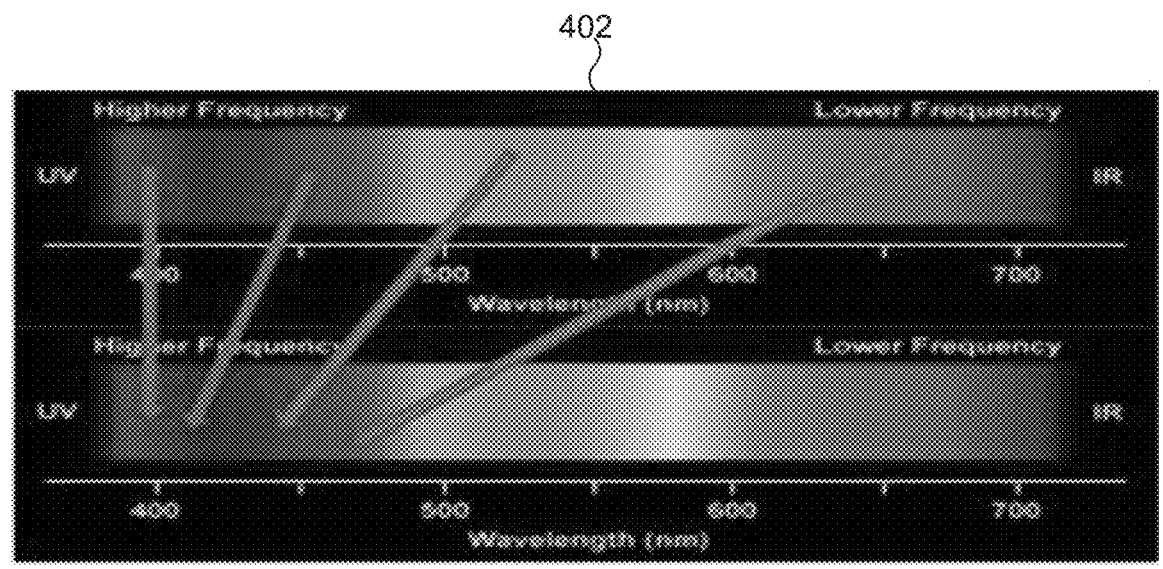
FIGS. 4A and 4B illustrate spectral mappings according to embodiments of the present disclosure.
Figure 4B:
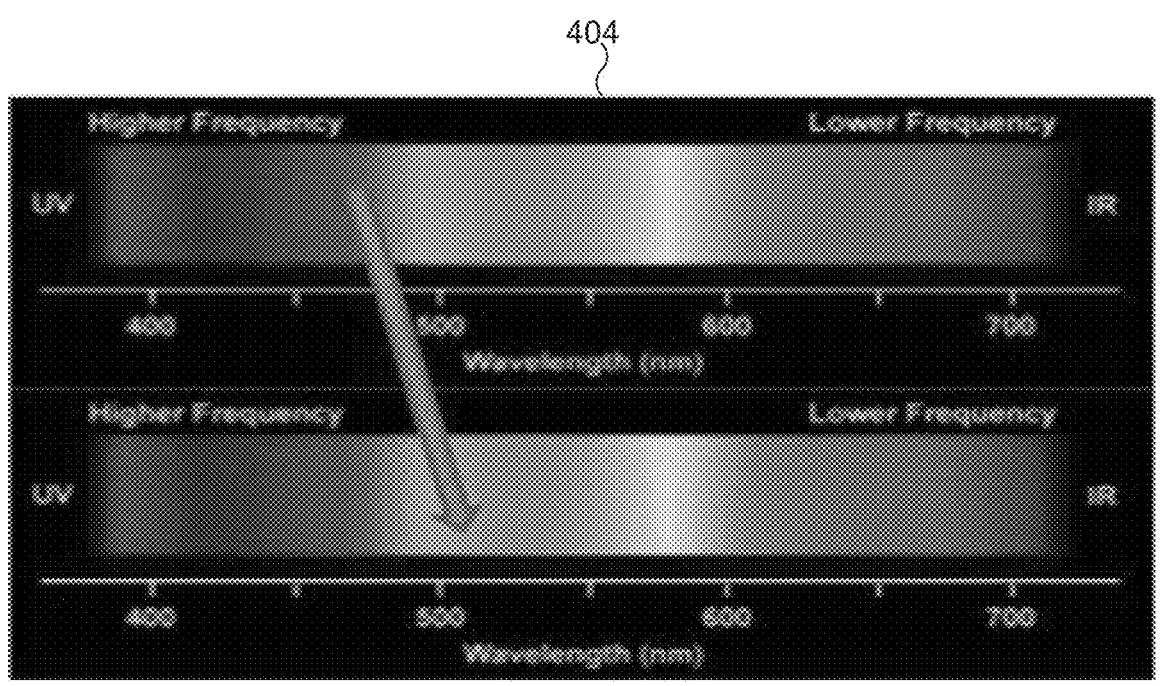

FIGS. 4A and 4B illustrate spectral mappings 402 and 404 according to embodiments of the present disclosure. The spectral mappings 402 and 404 shown in FIGS. 4A and 4B are for illustration only. Other embodiments of the spectral mappings 402 and 404 could be used without departing from the scope of this disclosure. The spectral mappings 402 and 404 could be implemented as part of HMD 200 as shown in FIG. 2.

In FIG. 4A, spectral colors with a lower frequency (e.g., blue and red colors) can be mapped to higher frequency spectral colors (e.g., violet and blue). This type of spectral mapping can be used for users with red/green color blindness. A user profile 312 can store the details on the hue or color saturation changes—as an example to handle strain in red color, a range of 0 to 120 degrees in hue can be mapped to 80 to 120 degrees. This modification shifts the red colors in the shader 280.

In FIG. 4B, spectral colors with a higher frequency can be mapped to lower frequency spectral colors. In addition, luminosity can be reduced. This type of spectral mapping can be used for users with eyestrain.

Figure 5A:
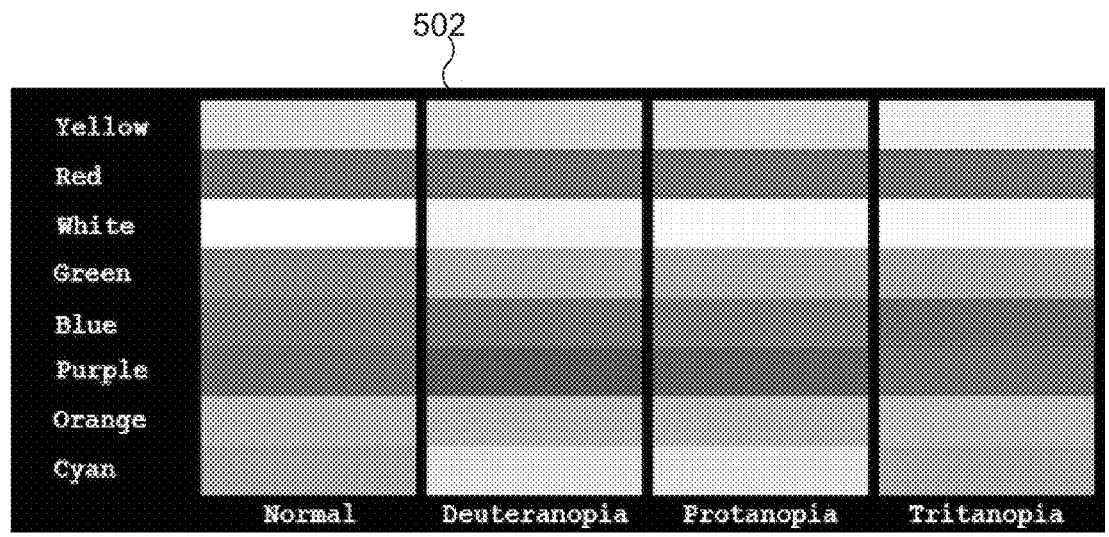
FIGS. 5A and 5B illustrate color charts according to embodiments of the present disclosure.
Figure 5B:
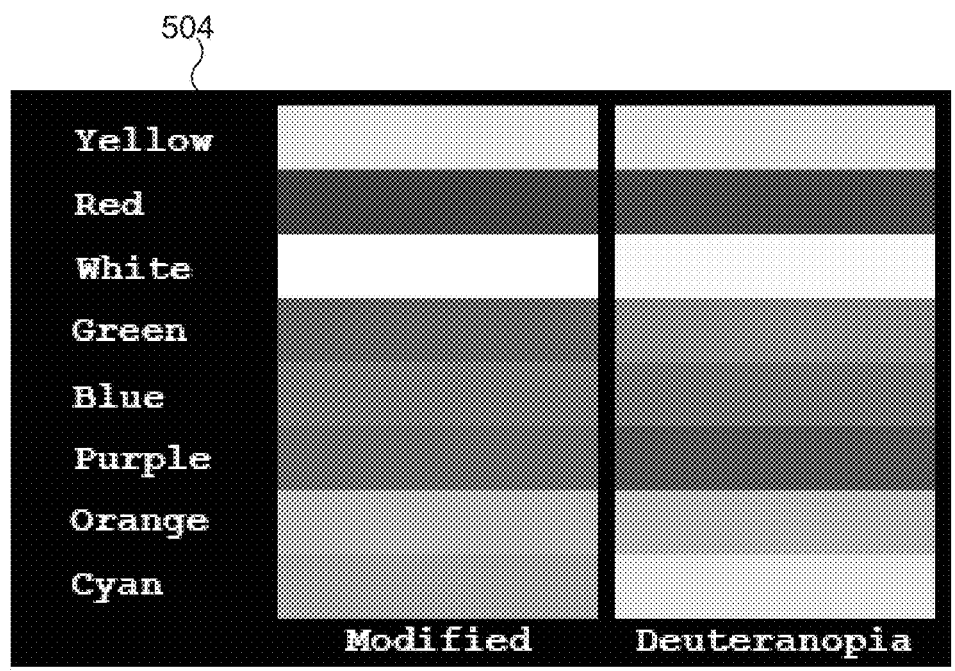

FIGS. 5A and 5B illustrate color charts 502 and 504 according to embodiments of the present disclosure. Charts 502 and 504 shown in FIGS. 5A and 5B are for illustration only. Other embodiments of the charts 502 and 504 could be used without departing from the scope of this disclosure. The charts 502 and 504 could be implemented as part of HMD 200 as shown in FIG. 2.

In FIG. 5A, color chart 502 illustrates a number of colors based on a visual condition of a user: normal, Deuteranopia, Protanopia, and Tritanopia. For example, the row "Green" illustrates what Green may appear to look like to each user with different conditions. In this example, the colors Green and Orange as used in the Normal set may appears the similar or the same to a user with Deuteranopia. The HMD 200 manufacturer can create user profiles 312 for common mappings.

In FIG. 5B, color chart 504 illustrates a modified set of colors and how the effect appears to a user with Deuteranopia. Shader 280 of FIG. 2 could modify the colors to account for the different conditions. For example, Green in the modified set may be a different hue than the Green in the Normal set of FIG. 5A. Because the Green in the modified set is a different hue, a user with Deuteranopia may now see two different colors between Orange and Green rather than the same color. Additionally, the red is a different hue in the modified set than the normal set. In one or more embodiments, the hue can be one of the attributes 308 shown in FIG. 3.

Figure 6:
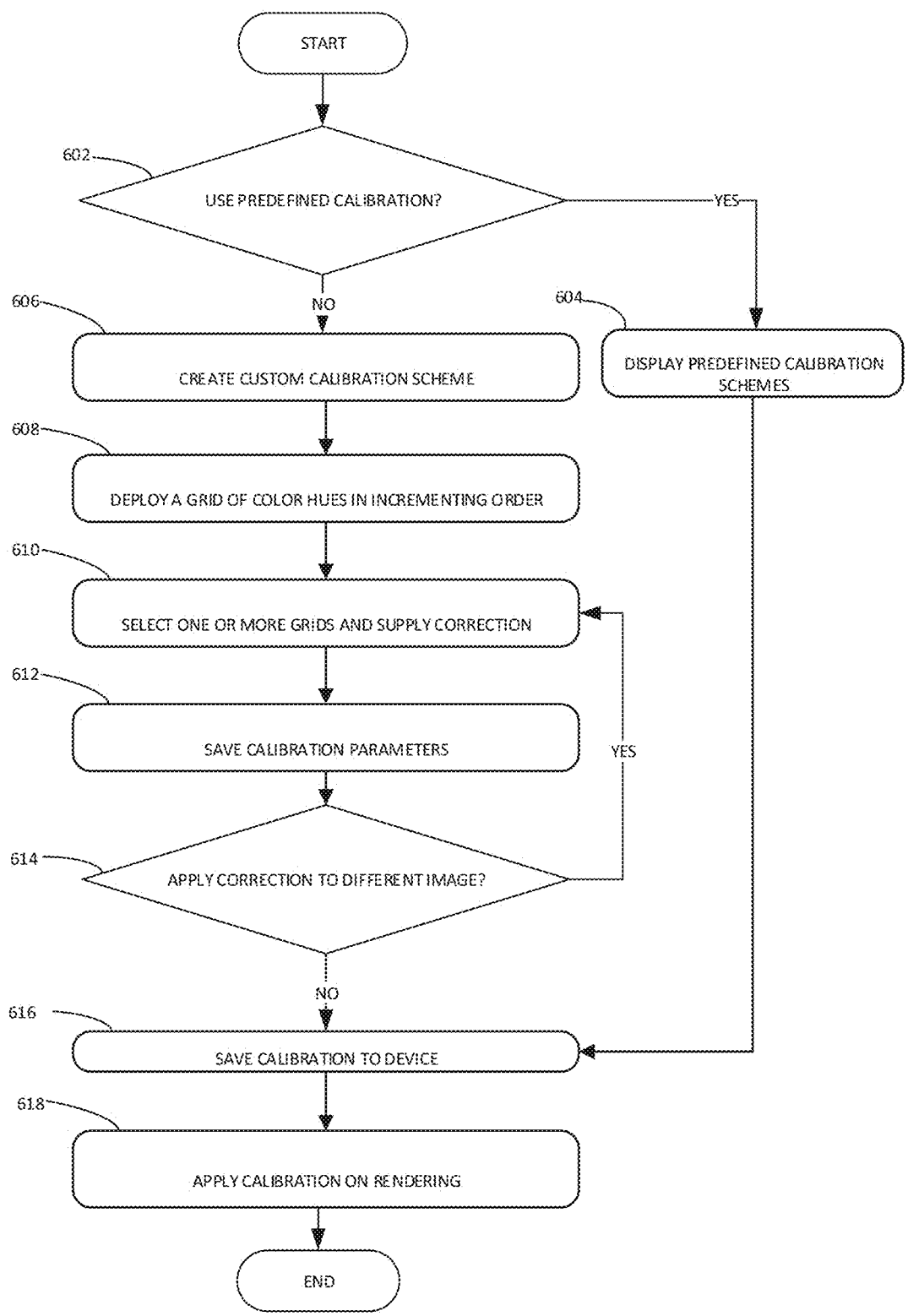
FIG. 6 illustrates an example process for creating or using an image calibration scheme according to embodiments of the present disclosure.

FIG. 6 illustrates an example process 600 for creating or using an image calibration scheme according to embodiments of the present disclosure. The embodiment of the process 600 illustrated in FIG. 6 is for illustration only. However, the process 600 comes in a wide variety of configurations, and FIG. 6 does not limit the scope of this disclosure to any particular implementation for creating or using an image calibration scheme. The steps as presented in FIG. 6 can be performed by HMD 200 as shown in FIG. 2. As used herein, calibrating can be modifying image attributes.

As shown in FIG. 6, at step 602, an HMD 200 determines whether to use a predefined calibration. In this determination, the HMD 200 could rely on an input received from a user, metadata related to the content, and/or direction from an application. If the HMD 200 determines to use the predefined calibration, then at step 604, the HMD 200 can display predefined calibration schemes (profiles). The predefined calibration schemes can include different spectral mappings for different situations. For example, one scheme could be for users with Deuteranopia. Another scheme could be for users with eyestrain. Additional schemes could be for users with different conditions as discussed herein as well as other conditions. At step 616, a predefined calibration scheme can be saved to the device. The predefined calibration scheme can be selected by a user or the device based on biometric feedback, metadata, and the like.

When the HMD 200 determines not to use a predefined calibration, at step 606, the HDM 200 begins a process to create a custom calibration scheme. At step 608, the HMD 200 deploys a grid of color hues in incrementing order. At step 610, the HMD 200 selects one or more grids and supplies the correction including the calibration parameters. The HMD 200 can receive the selection from a user or an application. At step 612, the HMD 200 saves the calibration parameters as a custom user profile 312.

At step 614, the HMD 200 determines whether to apply correction (i.e., calibration) to a different image. The HMD 200 can receive this selection from a user or an application. If the HMD 200 determines to apply the correction to a different image, then the process moves to step 610. The calibration changes from each image becomes part of the final calibration for this user profile 312. If the HMD 200 determines not to apply correction to a different image, then at step 616, the HMD 200 saves the calibration to the device.

At step 618, the HMD 200 applies the calibration on rendering. The HMD 200 could use shader 280 to apply the calibration during rendering.

Although FIG. 6 illustrates example process 600 for creating or using an image calibration scheme, various changes could be made to FIG. 6. For example, while shown as a series of steps, various steps in each figure could overlap, occur in parallel, occur in a different order, or occur multiple times.

Figure 7:
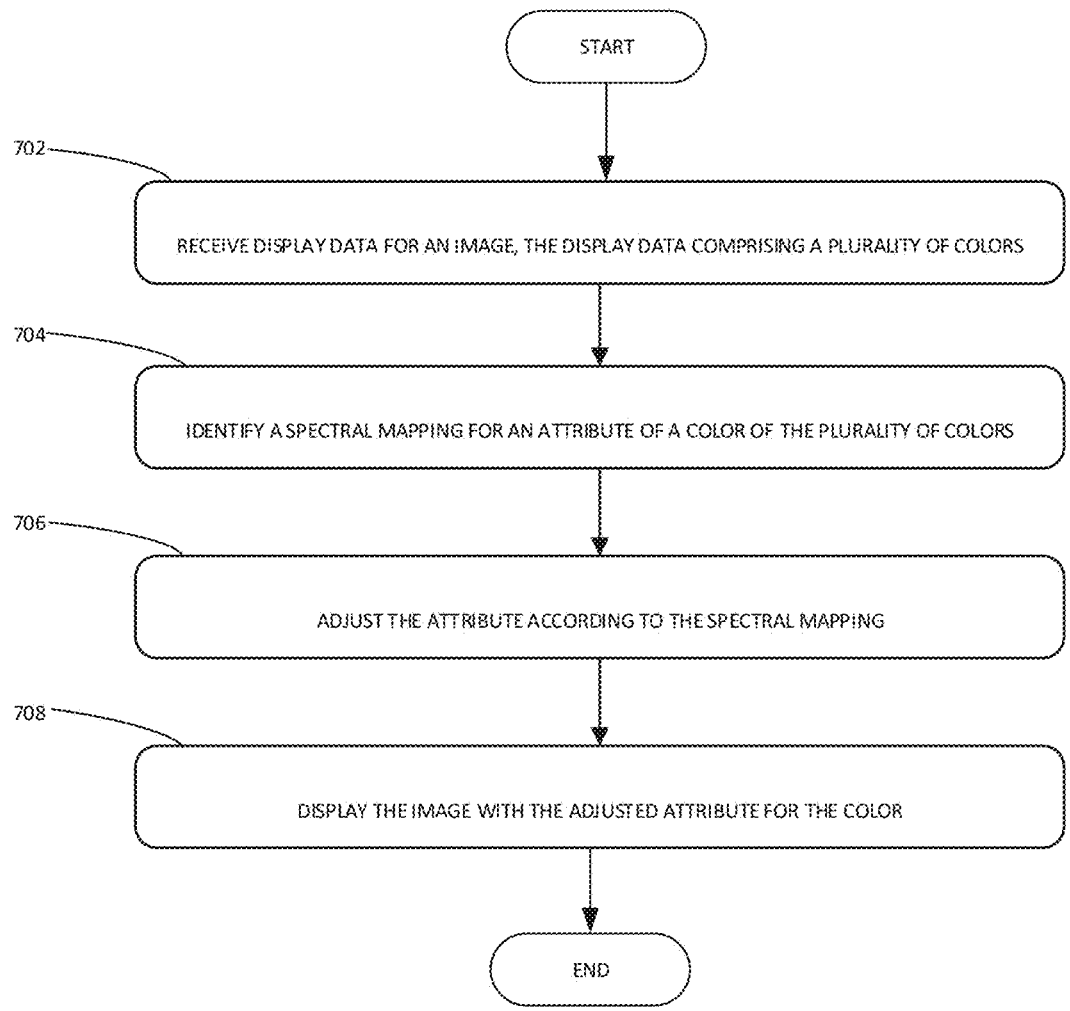
FIG. 7 illustrates an example process for calibrating an image according to embodiments of the present disclosure.

FIG. 7 illustrates an example process 700 for calibrating an image according to embodiments of the present disclosure. The embodiment of the process 700 illustrated in FIG. 7 is for illustration only. However, the process 700 comes in a wide variety of configurations, and FIG. 7 does not limit the scope of this disclosure to any particular implementation for calibrating an image. The steps as presented in FIG. 7 can be performed by HMD 200 as shown in FIG. 2.

As shown in FIG. 7, at step 702, an HMD 200 receives display data for an image, the display data comprising a plurality of colors. Each color of the plurality of colors includes a plurality of attributes.

At step 704, the HMD 200 identifies a spectral mapping, of the one or more spectral mappings, for an attribute of the plurality of attributes, where the attribute is related to a color of the plurality of colors. The HMD 200 may identify the spectral mapping (profile) based on user selection, biometric feedback, metadata, and the like. The spectral mapping indicates adjustments in the plurality of attributes. In one embodiment, the HMD 200 can identify a user profile associated with a user and retrieve the spectral mapping from the user profile. In another embodiment, the HMD 200 can identify an application being executed by at least one processor and select the spectral mapping based on the application. In yet another embodiment, the HMD 200 can obtain biometric feedback on a user and select the spectral mapping based on the biometric feedback of a user. In a further embodiment, the HMD 200 can obtain metadata related to the display data, wherein the meta data includes a description of the display data and select the spectral mapping based on the description included in the metadata At step 706, the HMD 200 adjusts the attribute of the plurality of attributes according to the spectral mapping. For example, the HMD 200 can adjust the hue or luminosity of a color. The HMD 200 can adjust the attribute using a shader for output to the display for all applications being executed by at least one processor.

At step 708 the HMD 200 uses a display to display the image with the adjusted attribute for the color.

Although FIG. 7 illustrates example process 700 for calibrating an image, various changes could be made to FIG. 7. For example, while shown as a series of steps, various steps in each figure could overlap, occur in parallel, occur in a different order, or occur multiple times.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An apparatus for modifying display settings, the apparatus comprising:
    a memory configured to store one or more spectral mappings, each spectral mapping comprising information about mapping a set of spectral colors to an adjusted set of spectral colors and color attribute adjustments for the set of spectral colors, the color attribute adjustments include at least one of color brightness, saturation and contrast adjustments;
    one or more sensors configured to obtain biometric feedback of a user, the biometric feedback comprises information on eye activity, brain activity and heart activity;
    at least one processor operably connected to the memory, the at least one processor configured to:
        receive, from an input, display data for an image, the display data comprises:
            color information for a plurality of colors in the image, and
            image color attributes for the plurality of colors in the image;
        detect a state for visual mitigation based in part on the biometric feedback of the user,
        retrieve a first spectral mapping, of the one or more spectral mappings, from the memory based on the detected state and the biometric feedback of the user,
        map the plurality of colors in the image to a first adjusted set of spectral colors according to the first spectral mapping,
        adjust the image color attributes, in response to detecting the state for visual mitigation, for the plurality of colors in the image according to first attribute adjustments of the first spectral mapping, wherein the adjustment of the image color attributes is based on metadata included in an application, and a usage time of applications, the usage time varying according to each of the applications, the metadata configured to determine a modification of the display data; and
    a display configured to receive the image with the mapped and adjusted display data and configured to display the image using the first adjusted set of spectral colors and adjusted image color attributes.

2. The apparatus of claim 1, wherein the at least one processor is further configured to map the plurality of colors and adjust the image color attributes using a shader for output to the display for all applications being executed by the at least one processor.

3. The apparatus of claim 1, wherein retrieving the first spectral mapping further comprises the at least one processor being configured to:
    detect the state, wherein the state is associated with the user; and
    retrieve the first spectral mapping from the memory based on a user profile.

4. The apparatus of claim 1, wherein the at least one processor is further configured to:
    detect the state, wherein the state is associated with an application being executed by the at least one processor; and
    retrieve the first spectral mapping based on the application.

5. The apparatus of claim 1, wherein the at least one processor is further configured to:
    obtain metadata related to the display data, wherein the metadata includes a description of the display data; and
    retrieve the first spectral mapping based on the description included in the metadata.

6. The apparatus of claim 1, wherein the at least one processor is further configured to:
    responsive to determining not to use a predefined calibration, provide a plurality of grids of color hues;
    receive a selection of one or more grids; and
    determine the state and retrieve the first spectral mapping based on the one or more selected grids.

7. The apparatus of claim 2, wherein the shader is configured to perform hatching by drawing different hatch patterns corresponding to the plurality of colors in the image.

8. A method of modifying an image color, the method comprising:
    receiving, from an input, display data for an image, the display data comprises:
        color information for a plurality of colors in the image; and
        image color attributes for the plurality of colors in the image;
    receiving, from one or more sensors, biometric feedback of a user, the biometric feedback comprises information on eye activity, brain activity and heart activity;
    detecting a state for visual mitigation based in part on the biometric feedback of the user;
    retrieving a first spectral mapping, of one or more spectral mappings, associated with the detected state and the biometric feedback of the user, each spectral mapping of the one or more spectral mappings comprises information about mapping a set of spectral colors to an adjusted set of spectral colors and color attribute adjustments for the set of spectral colors, the color attribute adjustments include at least one of color brightness, saturation and contrast adjustments;
    mapping the plurality of colors in the image to a first adjusted set of spectral colors according to the first spectral mapping;
    adjusting the image color attributes, in response to detecting the state for visual mitigation, for the plurality of colors in the image according to first attribute adjustments of the first spectral mapping, wherein the adjusting the image color attributes is based on metadata included in an application, and a usage time of applications, the usage time varying according to each of the applications, the metadata configured to determine a modification of the display data; and displaying the image using the first adjusted set of spectral colors and the adjusted image attributes.

9. The method of claim 8, wherein mapping the plurality of colors and adjusting the image color attributes comprises:

mapping the plurality of colors and adjusting the image color attributes using a shader for output to a display for all applications being executed by at least one processor.

10. The method of claim 8, wherein detecting the state comprises identifying a user profile associated with the user; and wherein retrieving the first spectral mapping is based on the user profile.

11. The method of claim 8, wherein detecting the state comprises identifying an application being executed by at least one processor; and wherein retrieving the first spectral mapping is based on the identified application.

12. The method of claim 8, wherein detecting the state comprises obtaining metadata related to the display data, the metadata includes a description of the display data; and wherein retrieving the first spectral mapping is based on the description included in the metadata.

13. The method of claim 8, wherein detecting the state comprises determining whether to use a predefined calibration;

responsive to determining not to use the predefined calibration, providing a plurality of grids of color hues;

receiving a selection of one or more grids; and identifying the first spectral mapping based on the one or more selected grids.

14. The method of claim 9, wherein the shader is configured to perform hatching by drawing different hatch patterns corresponding to the plurality of colors in the image.

15. A non-transitory computer readable medium comprising a plurality of instructions, that when executed by at least one processor, causes the at least one processor to:

receive display data for an image, the display data comprising color information for a plurality of colors in the image and image color attributes for the plurality of colors in the image;

receive biometric feedback of a user, the biometric feedback comprising information on eye activity, brain activity and heart activity;

detect a state for visual mitigation based in part on the biometric feedback of the user;

retrieve a first spectral mapping, of one or more spectral mappings, based on the detected state and the biometric feedback of the user, each spectral mapping of the one or more spectral mappings comprises information about mapping a set of spectral colors to an adjusted set of spectral colors and color attribute adjustments for the set of spectral colors, the color attribute adjustments include at least one of color brightness, saturation and contrast adjustments;

map the plurality of color in the image to a first adjusted set of spectral colors according to the first spectral mapping;

adjust the image color attributes, in response to detecting the state for visual mitigation, for the plurality of colors in the image according to the color attribute adjustments of the first spectral mapping, wherein the adjustment of the image color attributes is based on metadata included in an application, and a usage time of applications, the usage time varying according to each of the applications, the metadata configured to determine a modification of the display data; and display the image using the first adjusted set of spectral colors and the adjusted image color attributes.

16. The non-transitory computer readable medium of claim 15, wherein the plurality of instructions for adjusting the image color attributes comprises instructions for:

mapping the plurality of colors and adjusting the image color attributes using a shader for output to the display for all applications being executed by the at least one processor.

17. The non-transitory computer readable medium of claim 15, wherein the plurality of instructions for detecting the state comprises instructions for identifying a user profile associated with the user; and wherein retrieving the first spectral mapping is based on the user profile.

18. The non-transitory computer readable medium of claim 15, wherein the plurality of instructions for detecting the state comprises instructions for obtaining metadata related to the display data, the metadata includes a description of the display data; and wherein retrieving the first spectral mapping is based on the description included in the metadata.

19. The non-transitory computer readable medium of claim 15, wherein the plurality of instructions for detecting the state comprises instructions for determining whether to use a predefined calibration;

responsive to determining not to use the predefined calibration, providing a plurality of grids of color hues;

receiving a selection of one or more grids; and identifying the first spectral mapping based on the one or more selected grids.

20. The non-transitory computer readable medium of claim 16, wherein the shader is configured to perform hatching by drawing different hatch patterns corresponding to the plurality of colors in the image.

* * * * *